United States Patent [19]
Kim

[11] Patent Number: 6,111,823
[45] Date of Patent: Aug. 29, 2000

[54] METHOD FOR RECORDING INFORMATION DATA ON MAGNETO-OPTICAL RECORDING MEDIUM WITHOUT CROSS-ERASING

[75] Inventor: Dae Young Kim, Seoul, Rep. of Korea

[73] Assignee: LG Electronics Inc., Seoul, Rep. of Korea

[21] Appl. No.: 09/223,179

[22] Filed: Dec. 30, 1998

[30] Foreign Application Priority Data

Dec. 31, 1997 [KR] Rep. of Korea ............. 97-80820

[51] Int. Cl.$^7$ ............................................. G11B 11/00
[52] U.S. Cl. ............................................. 369/13
[58] Field of Search ..................... 369/13, 116, 112, 369/14, 54, 58, 275.2, 44.26, 110; 360/59, 114

[56] References Cited

U.S. PATENT DOCUMENTS

| | | |
|---|---|---|
| 4,998,231 | 3/1991 | Watanabe et al. ............. 369/13 |
| 5,170,383 | 12/1992 | Yonezawa et al. ............. 369/13 |
| 5,513,165 | 4/1996 | Ide et al. ............. 369/116 |
| 5,623,472 | 4/1997 | Bakx et al. ............. 369/116 |

FOREIGN PATENT DOCUMENTS

| | | |
|---|---|---|
| 1-112505 | 5/1989 | Japan . |
| 1-292603 | 11/1989 | Japan . |
| 1-317247 | 12/1989 | Japan . |
| 3-147548 | 6/1991 | Japan . |

*Primary Examiner*—Tan Dinh

[57] ABSTRACT

A data recording method for a magneto-optical recording medium that is adapted to record a data on the magneto-optical recording medium without cross-erasing. In this method, a laser light is irradiated onto the magneto-optical recording medium to record a data. Reflective lights reflected by the magneto-optical recording medium are detected and a first and second signal are produced from the reflective lights. The intensity of a light to be irradiated onto the magneto-optical recording medium is controlled on the basis of the third signal. The third signal is obtained by the operation of the first and second signals.

18 Claims, 6 Drawing Sheets

FIG.2
RELATED ART
CHCK 
CHBT 
LPB 
MM 
RMT 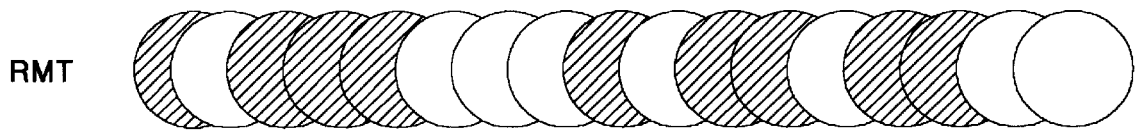

METHOD FOR RECORDING INFORMATION DATA ON MAGNETO-OPTICAL RECORDING MEDIUM WITHOUT CROSS-ERASING

BACKGROUND OF THE INVENTION

1. Field of the Invention

This invention relates to a method of recording a data on a magneto-optical recording medium and an apparatus thereof.

2. Description of the Related Art

Nowadays, a magneto-optical recording medium is available for an information recording medium permitting a high density of overwriting in the market. In particular, a magneto-optical recording medium using a recording layer made from an amorphous alloy of the rare-earth metal with the transition metal shows an excellent characteristic.

A process of recording a data on such a magneto-optical recording medium will be briefly described below. A laser light is converged onto the surface of the magneto-optical recording medium in a shape of a small spot having approximately a size of the wavelength thereof to increase a temperature in a recording layer into about 150 to 200° C. When a temperature in the recording layer of the magneto-optical recording medium heated with a laser light becomes above the Curie temperature Tc, a magnetization phenomenon disappears at the corresponding portion in the magneto-optical recording medium. At this time, if a direct-current bias magnetic field is applied to the magneto-optical recording medium in a unitary direction by means of a magnet, then a magnetization inversion arises to emerge a mark or pit when the heated portion of the recording layer returns to the room temperature.

An example of a recording apparatus for the magneto-optical recording medium for recording a data on the magneto-optical recording medium in this manner was disclosed in the Japanese Laid-open Patent Gazette No. heisei 1-292603. The recording apparatus in the Japanese patent has a circuit configuration as shown in FIG. 1. In FIG. 1, a channel clock generator 9 generates a channel clock signal CHCK as shown in FIG. 2 on a basis of an information pre-formatted on a magneto-optical disc 8. A laser driver 11 allows a laser diode 1 to make a pulse emission in accordance with the channel clock signal CHCK, thereby irradiating a laser pulse beam LPB as shown in FIG. 2 onto the magneto-optical disc 8 in a spot shape by means of an objective lens 3. A data signal generator 6 generates a modulated magnetic field MM as shown in FIG. 2 using a magnetic head 5 installed in the vicinity of the magneto-optical disc 8. Accordingly, a recording mark train RMT, as shown in FIG. 2, corresponding to a channel bit train CHBT as shown in FIG. 2 emerges at the magneto-optical disc 8. Since a laser light is irradiated onto the magneto-optical disc 8 in the pulse shape as described above, the recording marks emerging at the magneto-optical disc 8 are partially overlapped. Also, since the recording marks are overlapped, a data recording density in the magneto-optical disc 8 increases.

Light power must be constantly maintained so as to produce the recording marks of the same size. The light power determining the size of the recording mark may be strengthened or weakened depending on temperature, exterior interference, etc. Actually, the recording marks increase or decrease in size as recorded on the second track shown in FIG. 3 depending on variation in light power. In detail, if the light power is appropriately maintained, the recording marks each have the appropriate size as recorded in the second track region SMTR. When light power is weakened, no problems are created because the size of the recording mark decreases as recorded in the first track region FMTR. On the other hand, when light power is strengthened, the size of the recording mark increases as recorded in the third track region TMTR and the width of track is broadened to thereby cause a so-called "cross-erasing" that allows marks pre-recorded on the adjacent tracks to be erased. Such a variation in the light power can not heighten a track density in the magneto-optical recording medium above a certain limit.

SUMMARY OF THE INVENTION

Accordingly, it is an object of the present invention to provide a data recording method and apparatus for a magneto-optical recording medium that is adapted to record a data on the magneto-optical recording medium without occurring a cross-erasing.

Further object of the present invention is to provide a data recording method and apparatus for a magneto-optical recording medium that is adapted to record a data on the magneto-optical recording medium in such a manner to have a high track density.

In order to achieve these and other objects of the invention, a data recording method for a magneto-optical recording medium according to one aspect of the present invention includes the steps of detecting reflective lights reflected by the magneto-optical recording medium; producing a first and second signal from the reflective lights, the first and second signals each corresponding to both sides of a track divided by a center line of the track; and controlling the intensity of a light to be irradiated onto the magneto-optical recording medium on the basis of a third signal, the third signal being obtained by an operation on the first and second signals.

A data recording apparatus for a magneto-optical recording medium according to another aspect of the present invention includes means for detecting reflective lights reflected by the magneto-optical recording medium; means for producing a first and second signal from the reflective lights, the first and second signals each corresponding to both sides of a track divided by a center line of the track; and means for controlling the intensity of a light to be irradiated onto the magneto-optical recording medium on the basis of a third signal, the third signal being obtained by an operation on the first and second signals.

BRIEF DESCRIPTION OF THE DRAWINGS

These and other objects of the invention will be apparent from the following detailed description of the embodiments of the present invention with reference to the accompanying drawings, in which:

FIG. 2 is output waveform diagrams of each part of the recording apparatus in FIG. 1;

DETAILED DESCRIPTION OF THE PREFERRED EMBODIMENT

Figure 1:
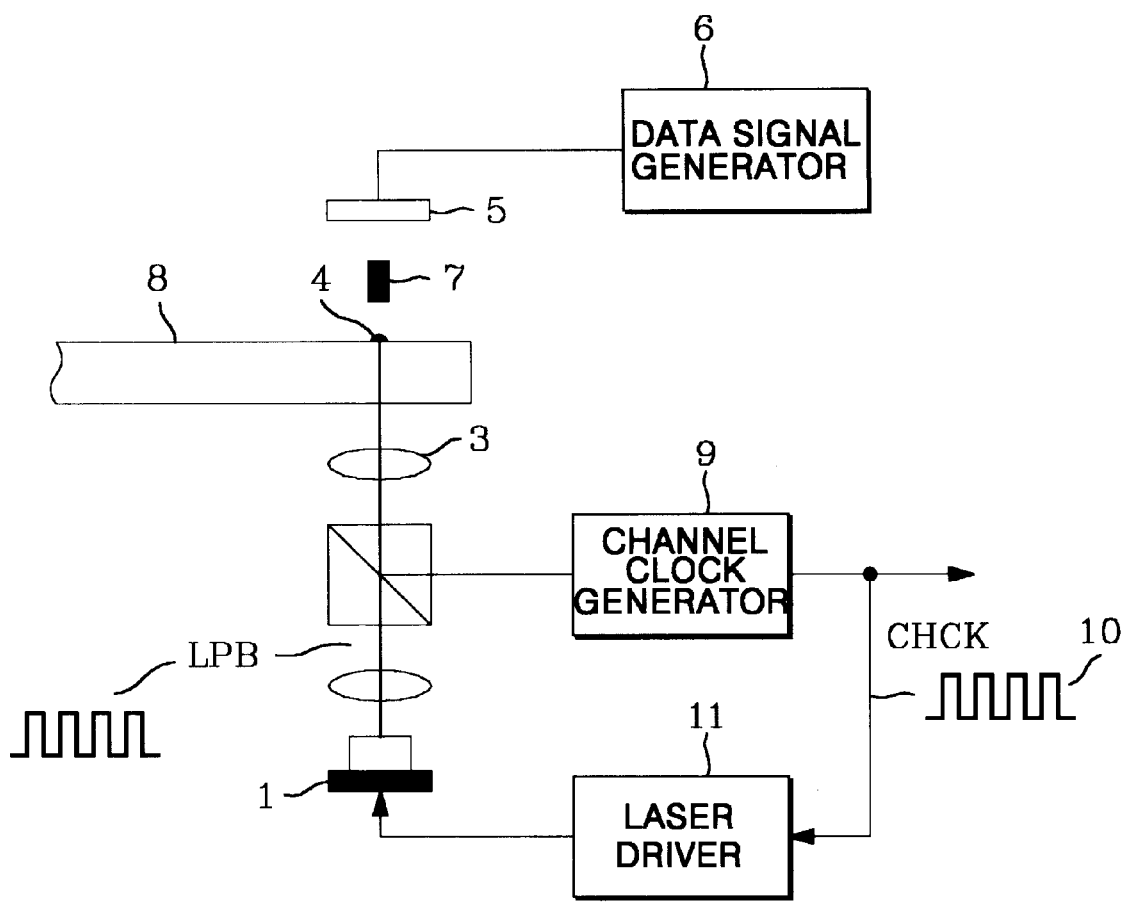
FIG. 1 is a schematic view showing the configuration of a conventional data recording apparatus for a magneto-optical recording medium.
Figure 3:
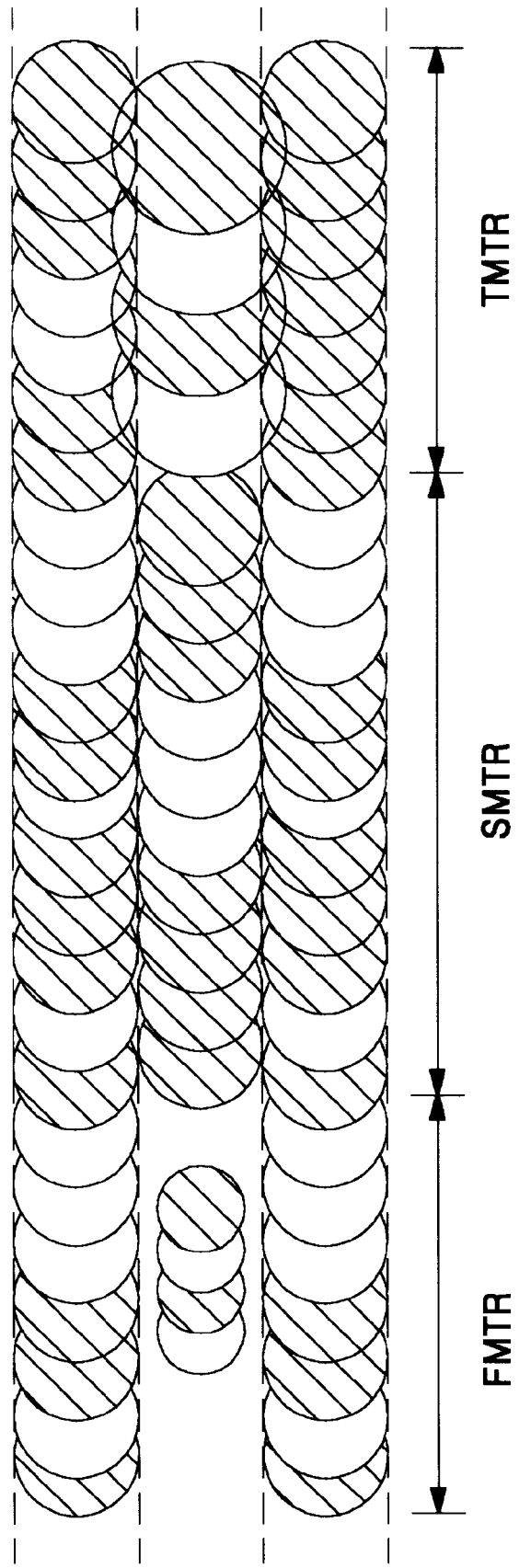
FIG. 3 illustrates a state of recording mark due to a variation in a light power.
Figure 4:
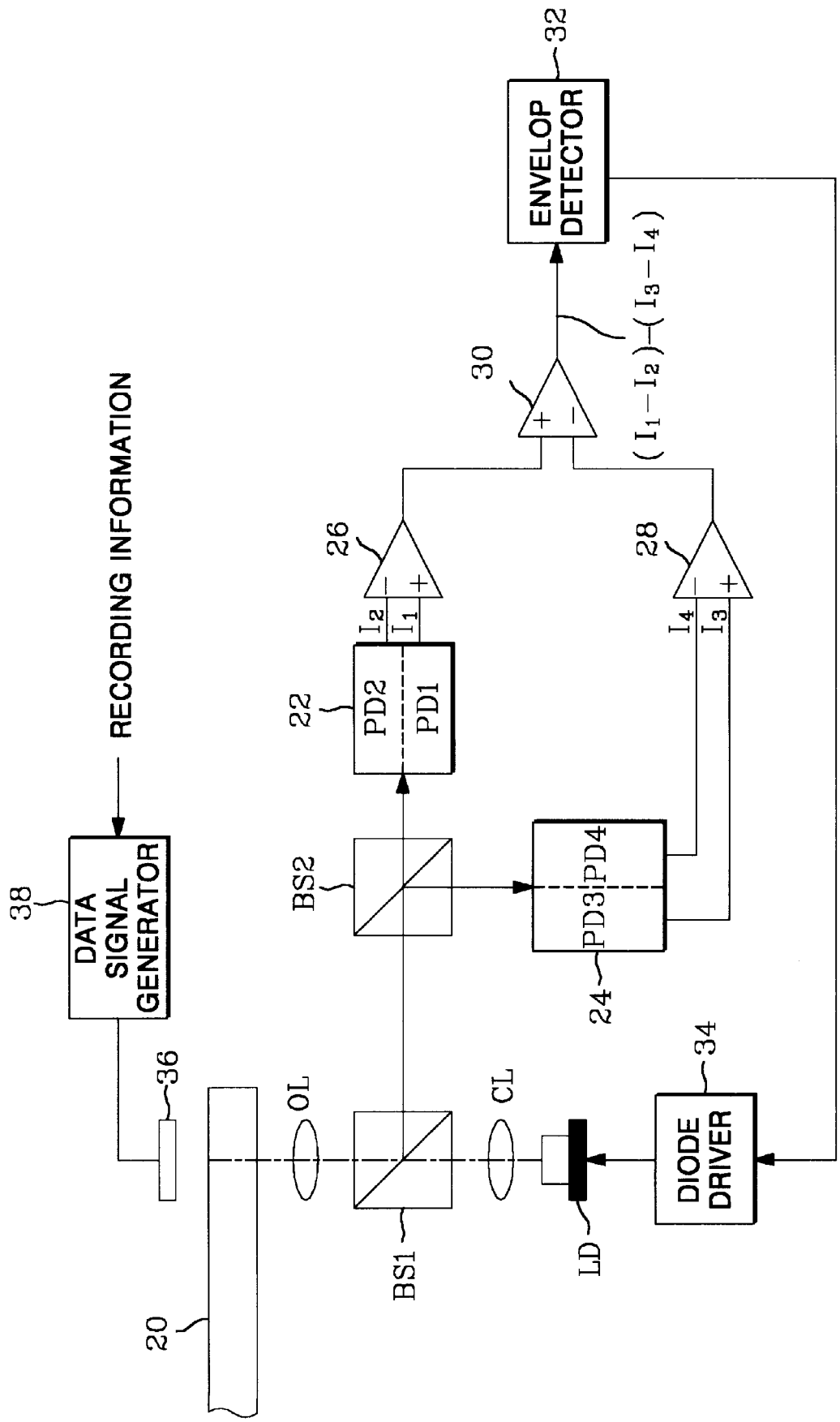
FIG. 4 is a schematic view showing the configuration of a data recording apparatus for a magneto-optical recording medium according to an embodiment of the present invention.

Referring to FIG. 4, there is shown a data recording apparatus for a magneto-optical disc according to an embodiment of the present invention. The recording apparatus includes a collimator lens CL arranged between an optical disc 20 and a laser diode LD, a first beam splitter BS1 and an objective lens OL. The laser diode LD generates a light beam to be irradiated onto the lower surface of the optical disc 20. A light beam generated at the laser diode LD is converged by means of the collimator lens CL and then irradiated, via the first beam splitter BS1 and the objective lens OL, onto the lower surface of the disc 20. The objective lens OL serves to focus a light beam to be irradiated onto the disc 20. The first beam splitter BS1 passes through a light beam from the collimator lens CL toward the objective lens OL; while directing a reflective light beam received, via the objective lens OL, from the disc 20 toward a second beam splitter BS2. The second beam splitter BS2 separates a reflective light beam from the first beam splitter BS1 into a P-polarized light beam and an S-polarized light beam.

Figure 5:
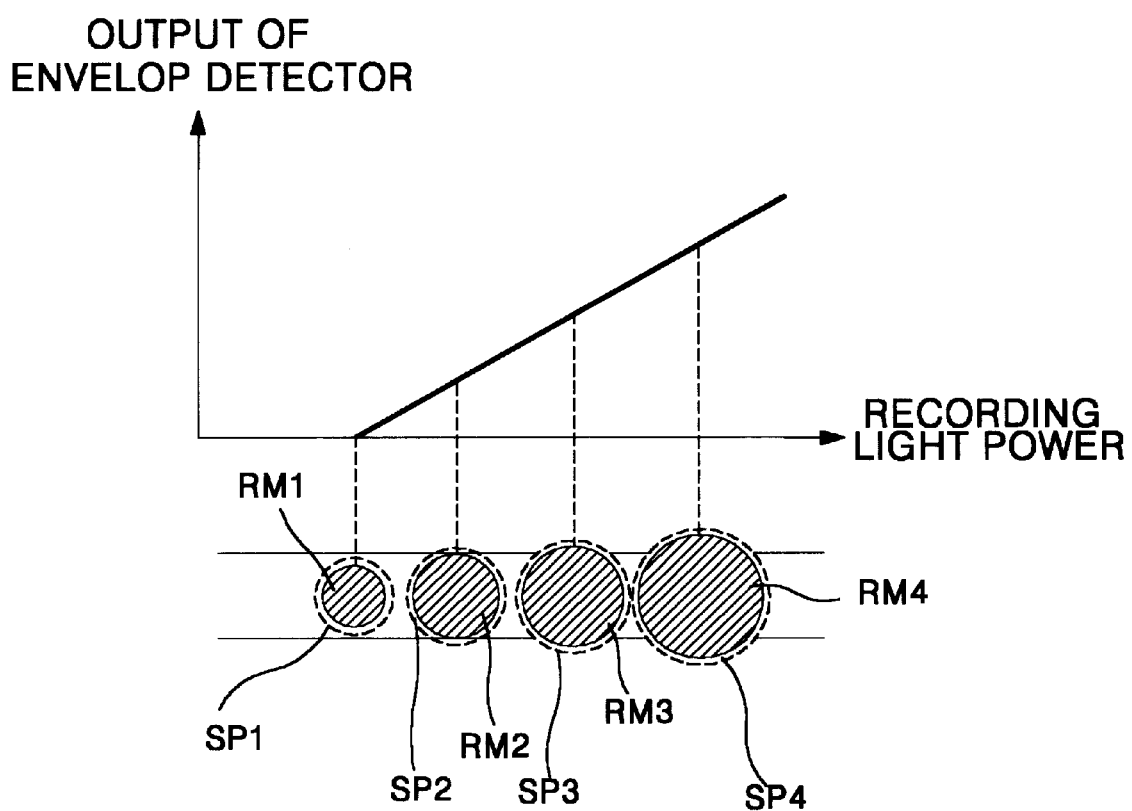
FIG. 5 represents a changing state of a recording mark according to an output signal of the envelope detector in FIG. 4.
Figure 6:
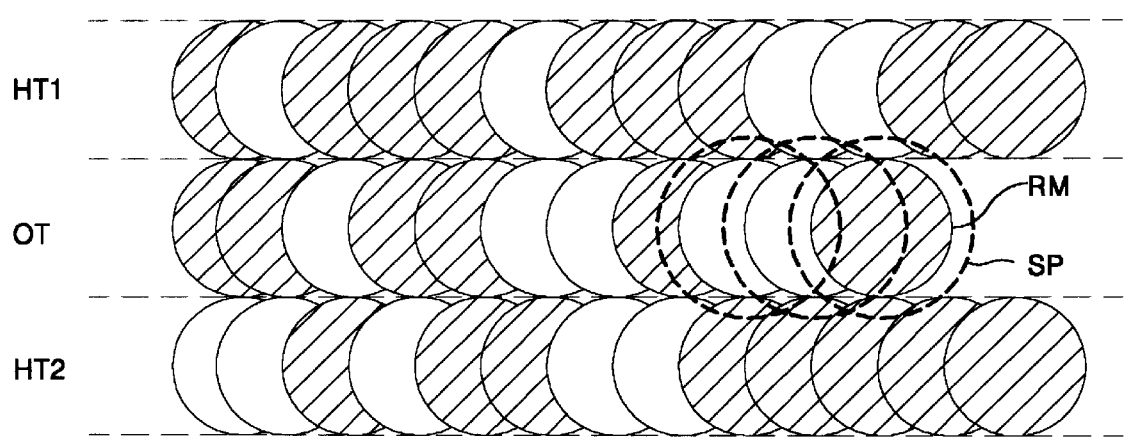
FIG. 6 illustrates a state of recording marks emerging at the recording medium by means of a data recording apparatus for a magneto-optical recording medium according to an embodiment of the present invention.

The recording apparatus further includes a first differential amplifier 26 connected between a first two-divisional photo detector 22 and a third differential amplifier 30, a second differential amplifier 28 connected a second two-divisional photo detector 24 and the third differential amplifier 30, and an envelope detector 32 and a diode driver 34 that are connected, in series, between the third comparator 30 and the laser diode LD. The first two-divisional photo detector 22 consists of a first and second photo detecting pieces PD1 and PD2 so as to detect a distributed state of the P-polarized light beam from the second beam splitter BS1. The first and second photo detecting pieces PD1 and PD2 are respectively installed at both side of the centerline of a track, in order to detect the quantity of light reflected by tracks adjacent to an objective track. The first and second photo detecting pieces PD1 and PD2 also generate first and second electrical signals I1 and I2 according to a light quantity of a P-polarized light beam irradiated onto itself, respectively. Likewise, the second two-divisional photo detector 24 consists of third photo detecting pieces PD3 and PD4 so as to detect a distributed state of the S-polarized light beam from the second beam splitter BS1. The third and fourth photo detecting pieces PD3 and PD4 are respectively disposed at both side of the centerline of a track and allow the quantity of light reflected by tracks adjacent to an objective track to be detected. The third and fourth photo detecting pieces generate third and fourth electrical signals I3 and I4 according to the light quantity of the S-polarized light beam irradiated onto itself, respectively. All the first and second two-divisional photo detectors 22 and 24 can be replaced with a four-divisional photo detector. The first differential amplifier 26 differentially amplifies the first and second electrical signals I1 and I2 from the first and second photo detecting pieces PD1 and PD2, respectively, and detects a difference signal between the two electrical signals I1 and I2. The second differential amplifier 28 differentially amplifies the third and fourth electrical signals I3 and I4 from the third and fourth photo detecting pieces PD3 and PD4, respectively, and detects a difference signal between the two electrical signals I3 and I4. The third differential amplifier 30 differentially amplifies output signals of the first and second differential amplifiers 26 and 28 to detect a difference signal between the two output signals. The difference signals generated at the first to third differential amplifiers 26 to 30 change in accordance with the size of recording marks. In other words, in the first to third differential amplifiers 26 to 30, voltage levels of the difference signals are higher as the size of recording marks becomes larger. The envelope detector 32 detects only an amplitude signal in an output signal (I1–I2)–(I3–I4) of the third differential amplifier 30. As shown in FIG. 5, an amplitude of the envelope signal detected at the envelope detector 32 has a higher level as the size of a recording mark emerging at the track of the disc 20 becomes larger. Also, a spot of a light beam irradiated onto the disc 20 has a slight larger size than the recording mark as shown in FIG. 5. In FIG. 5, if the spot of the light beam SP is not occupied, as SP1 of FIG. 5, i.e., when the spot of the light beam SP is irradiated on only an objective track OT, the output signal of the envelope detector 32 has a level voltage of "0 V". On the other hand, if regions on the adjacent tracks HT1 and HT2 occupied by the spot of the light beam SP are gradually enlarged, as SP2 through SP4 shown in FIG. 5, the swing width of the envelope signal generated by the envelope detector 32 is also gradually enlarged. Therefore, as if the spot of the light beam SP is constantly maintained in such a manner that the envelope signal detected by the envelope detector 32 has a constant amplitude, the recording marks can be formed to have a constant size. The diode driver 34 controls a power of a light beam generated at the laser diode LD using the envelope signal to thereby constantly maintain a light quantity and a spot size in a light beam irradiated onto the lower surface of the disc 20. More specifically, the diode driver 34 lowers a power of a light beam generated at the laser diode LD when an amplitude value of the envelope signal is higher than a reference value, whereas heightening a power of a light beam generated at the laser diode LD when an amplitude value of the envelope signal is lower than the reference value. Therefore, the spot of the light beam SP irradiated onto the objective track OT of the disc has a constant size, as shown in FIG. 6. Also, the size of the recording marks RM is constantly maintained regardless of temperature, exterior interference and so on, as shown in FIG. 6. A power of light beam is controlled in such a manner that the recording marks have the constant size as mentioned above, so that the size of recording mark can be set to a small value uniformly. Accordingly, the cross-erasing does not occur. Further, the track pitch of disc can be reduced and the track density can be heighten. Also, the diode driver 34 allows a light beam to be irradiated in a pulse shape to control an overlapping amount between the recording marks in the track direction besides the control of the light beam power.

Moreover, the recording apparatus includes a magnetic head 36 positioned at the upper portion of the disc 20, and a data signal generator 38 for receiving a recording information. The data signal generator 38 changes a direction of a magnetic field applied to the disc 20 from the magnetic head 36 in accordance with a logical value of a recording information, thereby recording an information on the disc 20.

In the apparatus of FIG. 4, any one of the two-divisional photo detectors 22 and 24 can be employed. In this case, if only the first two-divisional photo detector 22 is installed, the second beam splitter BS2, and the second and third differential amplifiers 28 and 30 are eliminated and the output signal of the first differential amplifier 26 is applied to the envelope detector 32. Therefore, the envelope detector 32 detects the envelope signal from the output signal of the first differential amplifier 26.

As described above, the data recording apparatus for a magneto-optical recording medium according to the present invention controls a power of a light beam irradiated onto the disc by means of a reflective beam reflected by the disc upon recording of an information, thereby constantly maintaining a spot of a light beam irradiated onto the surface of the disc. Accordingly, the data recording apparatus for a magneto-optical recording medium according to the present invention is capable of preventing an occurrence of the cross-erasing as well as reducing the size of recording mark. As a result, it can heighten a track density of the disc and improve a recording capacity of the disc.

The recording apparatus in FIG. 4 has been explained in conformity to a case of controlling the power of a light beam simultaneously with the recording, but it is possible to control the power of a light beam using a light quantity reflected by the pre-recorded mark or to control the power of light beam using a light quantity reflected by a recording mark on a test area of the disc after writing a recording mark onto the test area. In the case of the pre-recording marks, the data recording apparatus detects the light quantities reflected by the pre-recording marks and establishes a reference value on the basis of the detected light quantities. Also, the data recording apparatus controls the light of light beam depending on the reference value. Therefore, the light beam is irradiated on the track of the disc as a spot of constant size and the recording marks are constantly formed on the track of the disc. The recording marks can include a test data established by manufacturers. Next, in the case of accessing a test area of disc, the data recording apparatus records test marks onto the test area of the disc in such a manner that the power of the light beam is gradually varied. The data recording apparatus detects light quantities reflected by the recording marks on the test area of the disc, and sets up a reference value on the basis of the detected light quantities. In the record mode, the power of the light beam is adjusted depending on the reference value. In these cases, both a P-polarized light beam and S-polarized light beam are employed, or any one of these polarized light beams can be used. Also, the data recording apparatus according to the present invention is applicable to a disc having only one track adjacent to the objective track.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of recording a data on a magneto-optical recording medium, comprising the steps of:
   detecting reflective lights reflected by the magneto-optical recording medium;
   producing a first and second signal from the reflective lights, the first and second signals each corresponding to both sides of a track divided by a center line of the track; and
   controlling the intensity of a light to be irradiated onto the magneto-optical recording medium on the basis of a third signal, the third signal being obtained by an operation on the first and second signals.

2. The method as claimed in claim 1, wherein the operation on the first and second signals includes a step of comparing the first and second signals.

3. The method as claimed in claim 2, wherein the third signal comprises an envelope component detected from a resultant obtained by comparing the first and second signals.

4. The method as claimed in claim 1, wherein the reflective light includes an S-polarized component and P-polarized component.

5. The method as claimed in claim 4, wherein the P-polarized component allows a first and second P-polarized signal each corresponding to both sides of the center line of the track, and the S-polarized component causes a first and second S-polarized signal each corresponding to both sides of the center line.

6. The method as claimed in claim 5, wherein the third signal is obtained by subtracting an S-polarized and P-polarized comparison signal, the S-polarized comparison signal being delivered by comparing the first and second S-polarized signals and the P-polarized comparison signal being generated by comparing the first and second P-polarized signals.

7. The method as claimed in claim 6, wherein the step of detecting the reflective light is done simultaneously with a step of recording a data.

8. The method as claimed in claim 1, wherein the magneto-optical recording medium record data by the lights irradiated thereon.

9. The method as claimed in claim 1, wherein the light is irradiated on a test area for establishing the power of a recording light.

10. An apparatus of recording a data on a magneto-optical recording medium, comprising:
    means for detecting reflective lights reflected by the magneto-optical recording medium;
    means for producing a first and second signal from the reflective lights, the first and second signals each corresponding to both sides of a track divided by a center line of the track; and
    means for controlling an intensity of a light to be irradiated onto the magneto-optical recording medium on the basis of a third signal, the third signal being obtained by an operation on the first and second signals.

11. The apparatus as claimed in claim 10, wherein the operation on the first and second signals includes a comparison of the first and second signals.

12. The apparatus as claimed in claim 11, wherein the third signal comprises an envelope component detected from a resultant obtained by comparing the first and second signals.

13. The apparatus as claimed in claim 10, wherein the reflective light includes an S-polarized component and P-polarized component.

14. The apparatus as claimed in claim 13, wherein the P-polarized component allows a first and second P-polarized signal each corresponding to both sides of the center line of the track, and the S-polarized component causes a first and second S-polarized signal each corresponding to both sides of the center line.

15. The apparatus as claimed in claim 14, wherein the third signal is obtained by subtracting an S-polarized and P-polarized comparison signal, the S-polarized comparison signal being delivered by comparing the first and second S-polarized signals and the P-polarized comparison signal being generated by comparing the first and second P-polarized signals.

16. The apparatus as claimed in claim 15, wherein the means of detecting the reflective light is driven when a data is recorded on the magneto-optical recording medium.

17. The apparatus as claimed in claim 10, wherein the magneto-optical recording medium record data by the lights irradiated thereon.

18. The apparatus as claimed in claim 10, wherein the light is irradiated on a test area for establishing the power of a recording light.

* * * * *